(12) United States Patent
Newman et al.

(10) Patent No.: US 10,109,104 B2
(45) Date of Patent: Oct. 23, 2018

(54) GENERATION OF 3D MODELS OF AN ENVIRONMENT (71) Applicant: Oxford University Innovation Limited, Oxford (GB)

(72) Inventors: Paul Michael Newman, Oxford (GB); Ian Baldwin, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 413 days.

(21) Appl. No.: 14/769,201

(22) PCT Filed: Feb. 21, 2014

(86) PCT No.: PCT/GB2014/050539
§ 371 (c)(1),
(2) Date: Aug. 20, 2015

(87) PCT Pub. No.: WO2014/128498
PCT Pub. Date: Aug. 28, 2014

(65) Prior Publication Data
US 2015/0379766 A1 Dec. 31, 2015

(30) Foreign Application Priority Data
Feb. 21, 2013 (GB) .................................. 1303076.2

(51) Int. Cl.
*G01C 3/08* (2006.01)
*G06T 17/05* (2011.01)
(Continued)

(52) U.S. Cl.
CPC .............. *G06T 17/05* (2013.01); *G01S 17/87* (2013.01); *G01S 17/875* (2013.01); *G01S 17/89* (2013.01);
(Continued)

(58) Field of Classification Search
CPC ......... G06T 17/05; G06T 7/262; G06T 7/246; G06T 7/285; G06T 2200/04;
(Continued)

(56) References Cited

U.S. PATENT DOCUMENTS

| 2004/0105573 A1 | 6/2004 | Neumann et al. |
| 2004/0201514 A1 | 10/2004 | Stappaerts |

(Continued)

FOREIGN PATENT DOCUMENTS

| CN | 1751249 | 3/2006 |
| CN | 101640788 | 2/2010 |

(Continued)

OTHER PUBLICATIONS

Abdel-Hakim et al., CSIFT: A SIFT Descriptor with Color Invariant Characteristics, Proceedings of the 2006 IEEE Computer Society Conference on Computer Vision and Pattern Recognition, 2006, in 6 pages.

(Continued)

*Primary Examiner* — Samantha K Abraham
(74) *Attorney, Agent, or Firm* — Knobbe, Martens, Olson & Bear, LLP (57) ABSTRACT

Generating a 3D reconstruction of an environment around a monitoring-unit as that monitoring-unit is moved through the environment: a) providing at least a camera and a LIDAR sensor, each being controlled by independent clocks; b) using the camera to determine the trajectory of the monitoring-unit and determining a first time series using the clock of the camera, where the first time series details when the monitoring-unit was at predetermined points of the trajectory; c) recording the returns from the LIDAR sensor and determining a second time series using the clock of the LIDAR sensor, where the second time series details when each scan from the LIDAR was taken; d) using a timer to (Continued)

relate the first and second series in order to match the return from the LIDAR sensor to the point on the trajectory at which the return was received; and e) creating the 3D reconstruction based upon the LIDAR returns using information from the two time series.

19 Claims, 7 Drawing Sheets

(51) Int. Cl.
| | |
|---|---|
| *H04N 13/296* | (2018.01) |
| *G01S 17/87* | (2006.01) |
| *G01S 17/89* | (2006.01) |
| *H04N 5/225* | (2006.01) |
| *G06T 7/246* | (2017.01) |
| *G06T 7/262* | (2017.01) |
| *G06T 7/285* | (2017.01) |

(52) U.S. Cl.
CPC .............. *G06T 7/246* (2017.01); *G06T 7/262* (2017.01); *G06T 7/285* (2017.01); *H04N 5/2253* (2013.01); *H04N 13/296* (2018.05); *G06T 2200/04* (2013.01); *G06T 2207/10021* (2013.01); *G06T 2207/10028* (2013.01); *G06T 2207/30241* (2013.01); *G06T 2207/30252* (2013.01); *G06T 2215/16* (2013.01)

(58) Field of Classification Search
CPC . G06T 2207/10021; G06T 2207/10028; G06T 2207/30241; G06T 2207/30252; G06T 2215/16; G01S 17/87; G01S 17/875; G01S 17/89; H04N 5/2253; H04N 13/0239; H04N 13/0296
See application file for complete search history.

(56) References Cited

U.S. PATENT DOCUMENTS

| | | |
|---|---|---|
| 2006/0006309 A1 | 1/2006 | Dimsdale et al. |
| 2007/0247612 A1 | 10/2007 | Pack et al. |
| 2009/0323121 A1 | 12/2009 | Valkenburg et al. |
| 2010/0121577 A1 | 5/2010 | Zhang et al. |
| 2010/0316257 A1 | 12/2010 | Xu et al. |
| 2010/0329513 A1 | 12/2010 | Klefenz |
| 2011/0285842 A1 | 11/2011 | Davenport et al. |
| 2012/0099395 A1 | 4/2012 | Debrunner et al. |
| 2012/0099400 A1 | 4/2012 | Debrunner et al. |
| 2012/0162376 A1 | 6/2012 | Ohtomo et al. |
| 2013/0151444 A1 | 6/2013 | Blaschko et al. |
| 2015/0356357 A1 | 12/2015 | McManus et al. |
| 2017/0076455 A1 | 3/2017 | Newman et al. |

FOREIGN PATENT DOCUMENTS

| | | |
|---|---|---|
| EP | 0 911 647 | 4/1999 |
| EP | 1 517 158 | 3/2005 |
| GB | 2 411 532 | 8/2005 |
| GB | 2 434 269 | 7/2007 |
| JP | H08-315125 | 11/1996 |
| JP | 2012-154863 | 8/2012 |
| WO | WO 2001/069171 | 9/2001 |
| WO | WO 2004/042662 | 5/2004 |
| WO | WO 2005/054799 | 6/2005 |
| WO | WO 2007/030026 | 3/2007 |
| WO | WO 2007/094765 | 8/2007 |
| WO | WO 2009/061174 | 5/2009 |
| WO | WO 2011/120141 | 10/2011 |
| WO | WO 2011/152841 | 12/2011 |
| WO | WO 2012/134419 | 10/2012 |
| WO | WO 2014/114923 | 7/2014 |
| WO | WO 2015/181561 | 12/2015 |

OTHER PUBLICATIONS

Baldwin et al., "Road vehicle localization with 2D push-broom LIDAR and 3D priors", Robotics and Automation (ICRA), 2012 IEEE International Conference, 2012, pp. 2611-2617.

Barnard et al., "A Comparison of Computational Color Constancy Algorithms—Part I: Methodology and Experiments With Synthesized Data", IEEE Transaction on Image Processing, Sep. 9, 2002, vol. 11, No. 9, pp. 972-983.

Bay et al., "SURF: Speeded Up Robust Features", Computer Vision—ECCV 2006, 2006, pp. 404-417.

Behle, "Binary Decision Diagrams and Integer Programming", Doctoral Thesis, Universitat des Saarlandes, 2007, pp. 1-98.

Borges et al., "Vision-based Localization Using an Edge Map Extracted from 3D Laser Range Data", 2010 IEEE International Conference on Robotics and Automation, May 3-8, 2010, in 8 pages.

Calonder et al., "BRIEF: Binary Robust Independent Elementary Features", Computer Vision—ECCV 2010, 2010, in 14 pages.

Calonder et al., "BRIEF: Computing a local binary descriptor very fast", IEEE Transactions on Pattern Analysis and Machine Intelligence, 2012, vol. 34, No. 7, in 29 pages.

Corke et al., "Dealing with shadows: Capturing Intrinsic Scene Appearance for Image-based Outdoor Localisation", 2013 IEEE/RSJ International Conference on Intelligent Robots and Systems, Nov. 3, 2013, pp. 2085-2092.

Cummins et al., "Appearance-only SLAM at large scale with FAB-MAP 2.0", The International Journal of Robotics Research, Nov. 12, 2010, in 25 pages.

Davison et al., "MonoSLAM: Real-Time Single Camera SLAM", IEEE Transactions on Pattern Analysis and Machine Intelligence, Jun. 2007, vol. 29, No. 6, in 16 pages.

Finlayson et al., "Color constancy at a pixel", JOSA A, 2001, vol. 18, No. 2, in 28 pages.

Finlayson et al., "Intrinsic Images by Entropy Minimization", Computer Vision—ECCV, 2004, pp. 582-595.

Finlayson et al., "On the Removal of Shadows From Images", Pattern Analysis and Machine Intelligence, IEEE Transactions, 2006, vol. 28, No. 1.

Fischler et al., "Random Sample Consensus: A Paradigm for Model Fitting with Applications to Image Analysis and Automated Cartography", Communications of the ACM, Jun. 1981, vol. 24, No. 6, pp. 381-395.

Foster, David H., "Color constancy", Vision Research, 2011, vol. 51, pp. 674-700.

Furgale et al., "Visual teach and repeat for long-range rover autonomy", Journal of Field Robotics, Sep. 1, 2010, vol. 27, No. 5, pp. 534-560.

Geiger et al., "Are we ready for Autonomous Driving? The KITTI Vision Benchmark Suite", Computer Vision and Pattern Recognition (CVPR), 2012 IEEE Conference, 2012, pp. 3354-3361.

Glover et al., "FAB-MAP + RatSLAM: Appearance-based SLAM for Multiple Times of Day", 2010 IEEE International Conference on Robotics and Automation Anchorage Convention District, May 3-8, 2010, in 6 pages.

Grasshopper 2 GS2-FW, Technical Reference Manual, Point Grey, 2011, in 171 pages.

Guo et al., "Single-Image Shadow Detection and Removal using Paired Regions", Computer Vision and Pattern Recognition (CVPR), 2011 IEEE Conference, 2011, pp. 2033-2040.

Ho et al., "Detecting Loop Closure with Scene Sequences", International Journal of Computer Vision, Jan. 2007, vol. 74, No. 3, pp. 261-286.

Jegou et al., "Hamming embedding and weak geometric consistency for large scale image search", Computer Vision—ECCV, 2008, in 16 pages.

Kwatra et al., "Shadow Removal for Aerial Imagery by Information Theoretic Intrinsic Image Analysis", Computational Photography (ICCP), 2012 IEEE International Conference, 2012, pp. 1-8.

Lowe, David G., "Object Recognition from Local Scale-Invariant Features", The proceedings of the seventh IEEE international conference, 1999, vol. 2.

(56) References Cited

OTHER PUBLICATIONS

Maddern et al., "LAPS-II: Using Illumination Invariance for 6-DoF Day and Night Localisation with Monocular Cameras", in 8 pages.
Maddern et al., "Towards Robust Night and Day Place Recognition using Visible and Thermal Imaging", RSS 2012: Beyond laser and vision: Alternative sensing techniques for robotic perception, 2012, in 7 pages.
McManus et al., "Shady Dealings: Robust, Long-Term Visual Localisation using Illumination Invariance", in 6 pages.
McManus et al., "Visual Teach and Repeat Using Appearance-Based Lidar", Proceedings of IEEE International Conference on Robotics and Automation (ICRA), 2011, in 8 pages.
Milford et al., "SeqSLAM: Visual Route-Based Navigation for Sunny Summer Days and Stormy Winter Nights", Proceedings of the IEEE International Conference on Robotics and Automation (ICRA), May 14-18, 2012, in 7 pages.
Napier et al., "Cross-Calibration of Push-Broom 2D LIDARs and Cameras in Natural Scenes", Proceedings of 2013 IEEE International Conference on Robotics and Automation, 2013, in 6 pages.
Nocedal et al., "Numerical Optimization, Second Edition", 2000, in 683 pages.
Nuske et al., "Extending the Dynamic Range of Robotic Vision", Proceeding of the 2006 IEEE International Conference on Robotics and Automation, May 2006, in 6 pages.
Nuske et al., "Robust Outdoor Visual Localization Using a Three-Dimensional-Edge Map", Journal of Field Robotics, 2009, vol. 26, No. 9, pp. 728-756.
Ranganathan et al., "Towards illumination invariance for visual localization", Robotics and Automation (ICRA), 2013 IEEE International Conference, 2013, in 8 pages.
Ratnasingam et al., "Chromaticity Space for Illuminant Invariant Recognition", IEEE Transactions on Image Processing, Aug. 2012, vol. 21, No. 8, pp. 3612-3623.
Ratnasingam et al., "Study of the photodetector characteristics of a camera for color constancy in natural scenes", J. Opt. Soc. Am. A, Feb. 2010, vol. 27, No. 2, pp. 286-294.
Rosten et al., "Real time video annotations for augmented reality", Advances in Visual Computing, 2005, in 33 pages.
Shang, Global Search Methods for Solving Nonlinear Optimization Problems, Doctoral Thesis, University of Science and Technology of China, 1997, pp. 1-307.
Stewart et al., "LAPS—Localisation using Appearance of Prior Structure: 6-DoF Monocular Camera Localisation using Prior Pointclouds", Robotics and Automation (ICRA), 2012 IEEE International Conference, 2012, in 8 pages.
Sunderhauf et al., "Are We There Yet? Challenging SeqSLAM on a 3000 km Journey Across All Four Seasons", Workshop on Long-Term Autonomy, IEEE International Conference on Robotics and Automation (ICRA), 2013, in 3 pages.

Valgren et al., "SIFT, SURF and Season: Long-term Outdoor Localization Using Local Features", EMCR, 2007, in 6 pages.
Zhang et al., "Robust Appearance Based Visual Route Following for Navigation in Large-scale Outdoor Environments", The International Journal of Robotics Research, Mar. 1, 2009, vol. 28, No. 3, pp. 331-356.
Zhu et al., "Learning to Recognize Shadows in Monochromatic Natural Images", Computer Vision and Pattern Recognition (CVPR), 2010 IEEE Conference, 2010, in 8 pages.
Office Action issued in Chinese Application No. 2014800225569, dated Nov. 7, 2016.
Office Action issued in European Application No. 14711839.2, dated Feb. 6, 2017.
Harrison et al., "TICSync: Knowing When Things Happened", *IEEE International Conference on Robotics and Automation*, 2011, pp. 356-343.
Cappelle et al., "Virtual 3D City Model for Navigation in Urban Areas", *J Intell Robot Syst*, 2012, vol. 66, pp. 377-399.
Churchill et al., "Practice makes perfect? Managing and leveraging visual experiences for lifelong navigation", *Robotics and automation (ICRA)*, May 14, 2012, pp. 4525-4532.
Damen et al, "Egocentric Real-time Workspace Monitoring using an RGB-D camera", *Intelligent Robots and Systems (IROS), IEEE/RSJ International Conference*, Oct. 7, 2012, pp. 1029-1036.
Geiger, A., "Monocular road mosaicking for urban environments", *Intelligent Vehicles Symposium*, Jun. 3, 2009, pp. 140-145.
Kosecka, Jana, "Detecting Changes in Images of Street Scenes", *Computer Vision ACCV*, Nov. 5, 2012, vol. 7727, pp. 590-601.
Lobo et al., "Bayesian 3D Independent Motion Segmentation with IMU-aided RBG-D Sensor", *IEEE Int Conf on on Multisensor Fusion and Integration for Intelligent Systems (MFI)*, Sep. 13-15, 2012, pp. 445-450.
McManus et al., "Distraction suppression for vision-based pose estimation at city scales", *IEEE Int Conf on Robotics and Automation (ICRA)*, May 6-10, 2013, pp. 3762-3769.
Schiller et al., "Improved Video Segmentation by Adaptive Combination of Depth Keying and Mixture-of-Gaussians", *Field Programmable Logic and Application*, Jan. 1, 2011.
Taneja et al., "Image Based Detection of Geometric Changes in Urban Environments", *IEEE Int Conf on Computer Vision*, Jun. 11, 2011, pp. 2336-2343.
Wang et al., "What could move? Finding cars, pedestrians and bicyclists in 3D laser data", *IEEE Int Conf on Robotics and Automation (ICRA)*, May 14, 2012, pp. 4038-4044.
International Search Report issued in PCT Application No. PCT/GB2014/050539, dated May 21, 2014, in 4 pages.
Search Report issued in GB Application No. 1303076.2, dated Aug. 21, 2013, in 5 pages.
Office Action issued in Chinese Application No. 2014800225569, dated Aug. 8, 2017.
Office Action issued in European Application No. 14711839.2, dated Jun. 21, 2017, in 5 pages.

GENERATION OF 3D MODELS OF AN ENVIRONMENT

This invention relates to the generation of a three dimensional model of an environment. In particular this may be the generation of a 3D point cloud. In particular, but not exclusively, the invention may relate to the generation of a 3D model of the environment around a robot, such as a guided vehicle of the like. Other embodiments may relate to navigating a vehicle through an environment using a model of the environment.

It is often desirable to generate models of an environment, which models may be used for a variety of purposes. For example, it may be helpful to record a model of a building as that building is surveyed where the 3D model can subsequently be used to assess the building such as for fire-escapes, health and safety, etc. In other embodiments, such as in robotics, guided vehicles and the like, it can be desirable to generate a model of an environment in order to navigate the vehicle. However, prior art methods of generating models do not generate models as well and/or as easily as may be desired.

According to a first aspect of the invention there is provided a method of generating a representation of an environment around a monitoring-unit as that monitoring-unit is moved through the environment, the method comprising, at least one of the following steps:
  a) providing at least a first sensor and at least one LIDAR sensor, wherein the first and second sensors may be provided at a fixed orientation relative to one another and are controlled by independent clocks;
  b) using the first sensor to determine the trajectory of the monitoring-unit as it moves through the environment and may be to determine a first time series using the clock of the first sensor, where the first time series details when the monitoring-unit was at predetermined points of the trajectory;
  c) scanning the environment with the LIDAR sensor, recording the returns from the LIDAR sensor and may be determining a second time series using the clock of the LIDAR sensor, where the second time series details when each scan from the LIDAR was taken;
  d) processing the first and second time series, may be using a statistical method to relate the first and second series in order to match the return from the LIDAR sensor to the point on the trajectory at which the return was received; and
  e) creating, using the predetermined orientation between the first sensor and the LIDAR, a representation of the environment, around the monitoring-unit, based upon the LIDAR returns.

Embodiments providing such an arrangement are believed advantageous because they provide higher quality models of the environment through which the monitoring unit has been moved when compared to prior art methods.

In particular, some embodiments may use two dimensional LIDAR sensors. Such LIDAR sensor may also be referred to as LIDAR scanners; ie a sensor arranged to scan its environment. It is conceivable that some embodiments may use three dimensional LIDAR sensors but these are currently expensive.

There may be a plurality of LIDAR sensors and in particular there may be two LIDAR sensors.

The or each LIDAR sensors may be mounted in a push-broom arrangement. In particular, a LIDAR sensor may be mounted in a fixed relationship to the monitoring unit. In such embodiments, the LIDAR sensor may rely on the motion of the mounting unit to scan the environment.

Embodiments may be arranged such that the first sensor and the LIDAR sensor do not have overlapping fields of view. The method may be arranged to retrospectively combine data from the first sensor and the LIDAR sensor.

Some embodiments of the invention rely on the TICsync algorithm to provide the timing method that is used to relate timing series from the first and second clocks.

The first sensor may be provided by a camera and in particular may be provided by a stereoscopic pair of cameras. Conveniently, the method generates the trajectory from a Visual Odometry (VO) system processing the outputs from the first sensor. Such embodiments are believed advantageous because they rely on passive sensors and do not rely on extrinsic positioning systems, such as Global Positioning Systems or the like. Avoiding the use of such extrinsic positioning systems allows the method to be provided in areas which are not reached by such extrinsic systems (such as indoors, in urban environments, or the like).

According to a second aspect of the invention there is provided a monitoring unit, the monitoring unit comprising:
  a processing circuitry arranged to receive data from each of a first sensor and at least one LIDAR sensor;
  wherein the first sensor is controlled by a first clock, which provides a first time series, and is mounted in a fixed orientation relative to the monitoring unit and wherein the processing circuitry is arranged to generate a trajectory from the data received from the first sensor;
  wherein the LIDAR sensor is controlled by a second clock, which provides a second time series, and is mounted in a fixed orientation relative to the monitoring unit and wherein the LIDAR sensor is arranged to scan the environment of the monitoring unit as the monitoring unit is moved through the environment; and
  wherein the processing circuitry is arranged to receive the data from the LIDAR sensor, process the first and second time series, using a timing method, to relate them together and to match the data from the LIDAR sensor to the trajectory and generate a representation of the environment from that matching.

According to a third aspect of the invention there is provided a machine readable medium containing instructions which when read by a machine cause that machine to generate a representation of an environment around a monitoring-unit as that monitoring-unit is moved through the environment, wherein the instructions cause the method of the first aspect of the invention to be provided or the machine to provide at least a portion of the monitoring unit of the second aspect of the invention.

The machine readable medium referred to in any of the above aspects of the invention may be any of the following: a CDROM; a DVD ROM/RAM (including −R/−RW or +R/+RW); a hard drive; a memory (including a USB drive; an SD card; a compact flash card or the like); a transmitted signal (including an Internet download, ftp file transfer of the like); a wire; etc.

Features described in relation to any of the above aspects of the invention may be applied, mutatis mutandis, to any of the other aspects of the invention.

There now follows by way of example only, with reference to the accompanying drawings, a detailed description of embodiments of the invention of which.

Embodiments of the invention are described in relation to a monitoring unit 10 comprising a first sensor 100 and at least one LIDAR sensor 103 where the monitoring unit 10 is mounted upon a vehicle 102. The sensor 100 is arranged to monitor its locale and generate data based upon the monitoring thereby providing data on a sensed scene around the vehicle 102. Likewise, the LIDAR sensor 103 is also arranged to monitor its locale.

Figure 10:
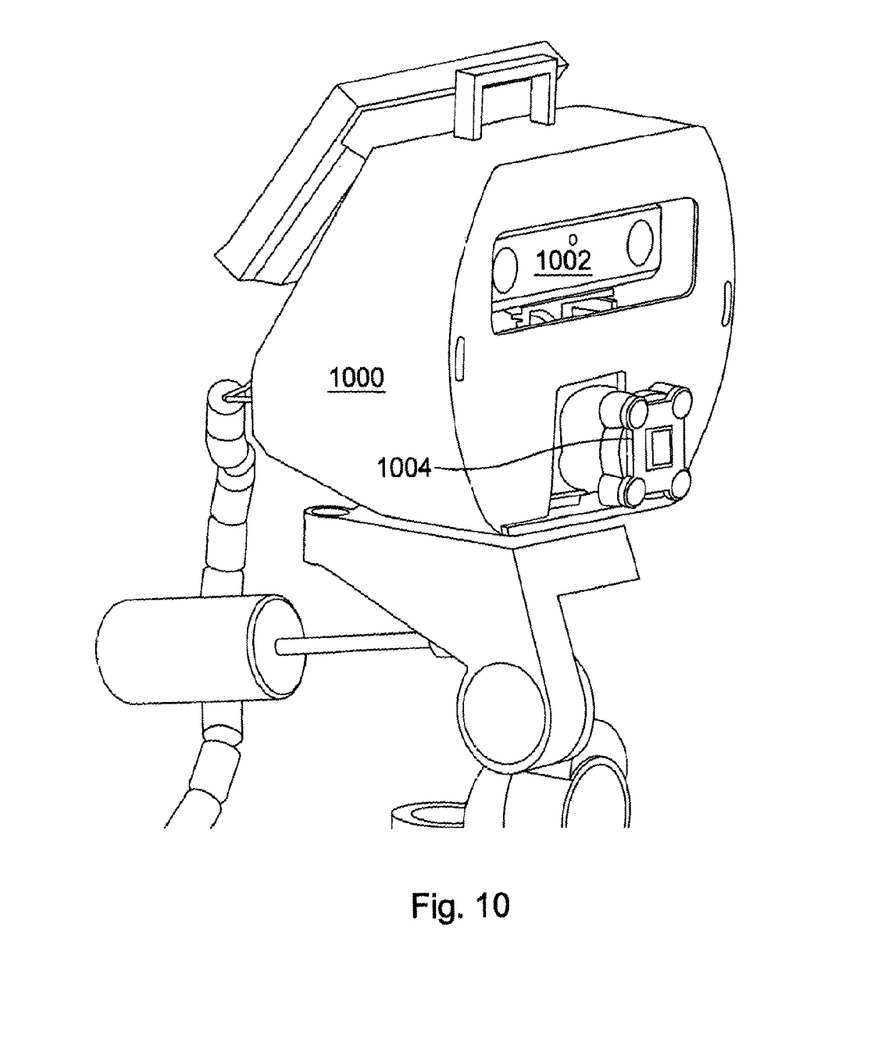
FIG. 10 shows a further embodiment of a monitoring unit.

Although, in the embodiment being described, the monitoring unit 10 is shown as a separate unit to the vehicle. In other embodiments the monitoring unit 10 need not be associated with a vehicle and could for instance be carried in a back-pack or the like (such as for example as shown in FIG. 10) and such embodiments are thus arranged to be carried by a person. In yet further embodiments, the monitoring unit may be integrated into a vehicle or the like.

In the embodiment being described, the first sensor 100 is a passive sensor (ie it does not create radiation and merely detects radiation) and in particular is a camera. More specifically, in the embodiment being described, the first sensor is a stereoscopic camera (such as the PointGrey Bumble-Bee); it comprises two cameras 104, 106. The skilled person will appreciate that such a sensor could be provided by two separate cameras rather than as a single sensor 100. Other embodiments may however rely on a single camera.

In other embodiments, the first sensor 100 may comprise other forms of sensor such as a laser scanner (LIDAR) or the like. As such, the first sensor 100 may also be an active sensor arranged to send radiation out therefrom and detect reflected radiation. The first sensor may also be replaced gyroscopic or inertial based sensors. In general embodiments may utilise any sensor type, for the first sensor, from which the trajectory of the vehicle 102 may be determined.

The vehicle 102 also comprises a second sensor 103, which in the embodiment being described is a LIDAR laser scanner. In particular in the embodiment being described the second sensor is a scanning-LIDAR sensor.

Figure 5:
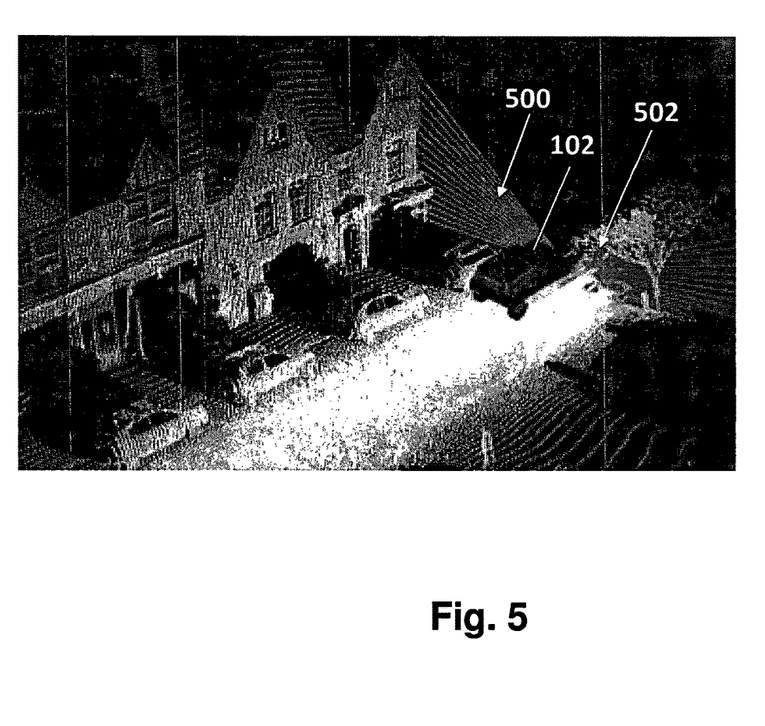
FIG. 5 shows a LIDAR acting in a push broom arrangement scanning an environment around a vehicle.
Figure 8:
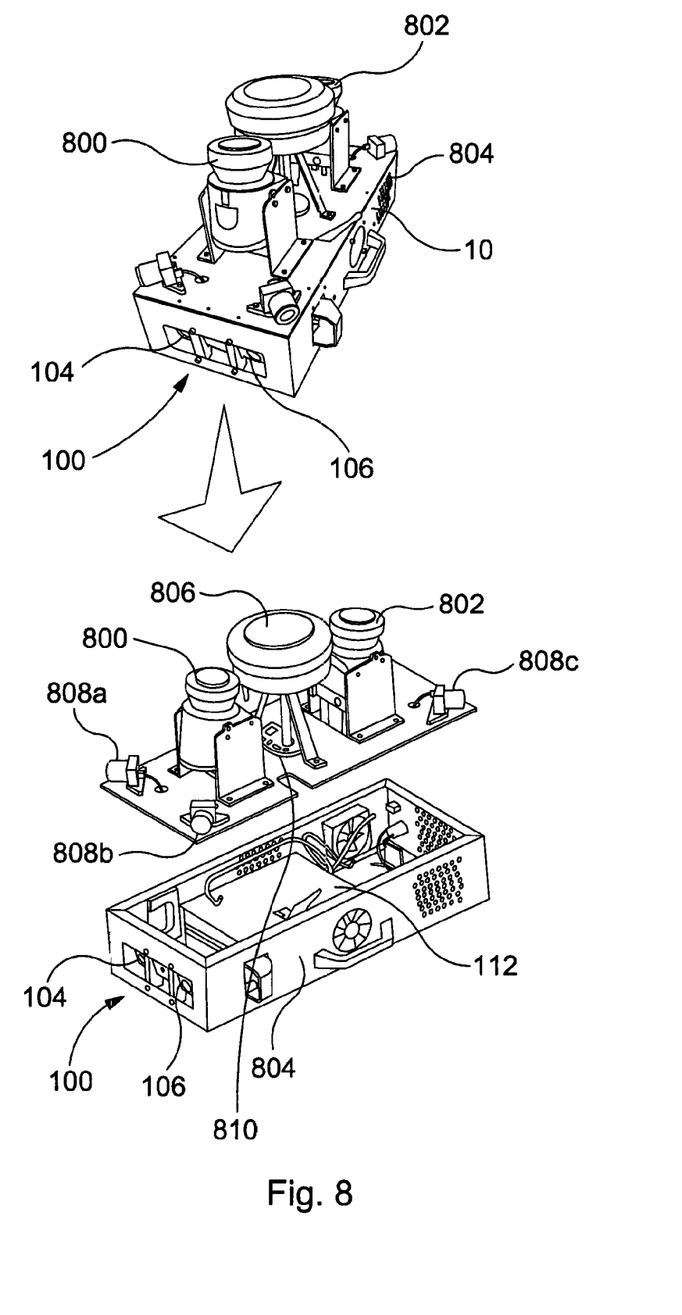
FIG. 8 shows an example of a monitoring unit in both an assembled and exploded views.

In one embodiment, as shown in FIGS. 5 and 8, the monitoring unit 10 comprises two LIDAR sensors (the SICK LMS-151) 800, 802. Each of the LIDAR sensors 800, 802 in this embodiment has a field of view of roughly 240° and one of the sensor 800 is arranged to scan the left side 500 (ie nearside) of the vehicle 102 and the other of the sensors 802 is arranged to scan the right side 502 (ie offside) of the vehicle 102.

Thus, in the embodiment of FIGS. 5 and 8, the LIDARs 800, 802 are mounted in a so-called push-broom configuration such that the radiation emitted therefrom scans the environment of the vehicle as the vehicle moves; ie it is the motion of the vehicle 102 that causes a scan of the environment to occur.

Embodiments using such 2D LIDAR (for example those used in this push-broom configuration) are believed advantageous as they are currently significantly cheaper than 3D LIDAR and easier to mount discretely.

Other laser sensors, such as those produced by Velodyne or the like, may also be used.

Figure 1:
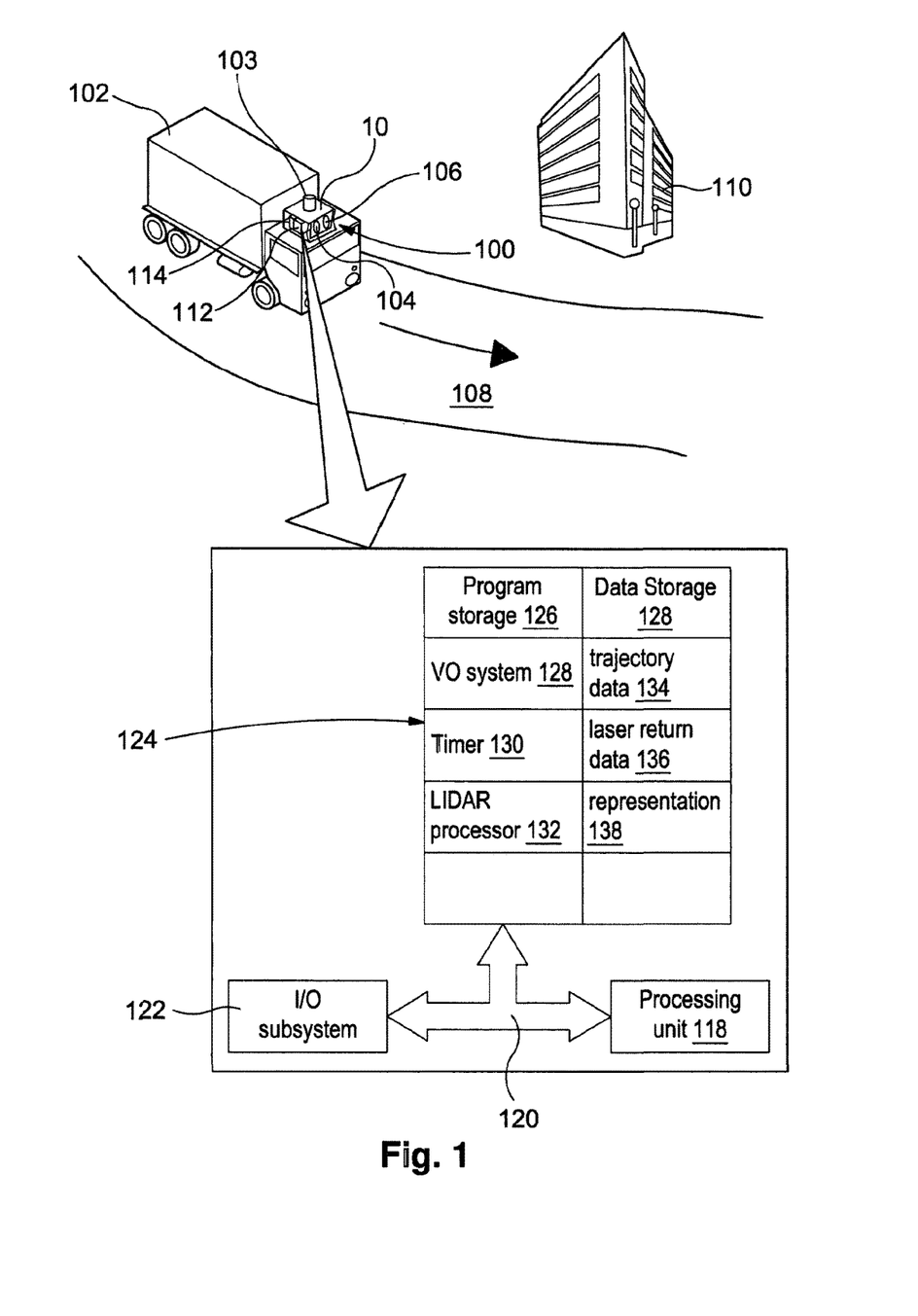
FIG. 1 schematically shows a vehicle fitted with sensors.

In the embodiment shown in FIG. 1, the vehicle 102 is travelling along a road 108 and the first sensor 100 is imaging the locale (eg the building 110, road 108, etc) as the vehicle 102 travels 900. In this embodiment, the monitoring unit 10 also comprises processing circuitry 112 arranged to capture data from the sensors 100, 103 and subsequently to process the captured image (first sensor 100) and LIDAR (sensor 103) data. In the embodiment being described, the processing circuitry 112 also comprises, or has access to, a storage device 114.

The lower portion of the Figure shows components that may be found in a typical processing circuitry 112. A processing unit 118 may be provided which may be an Intel® X86 processor such as an i5, i7 processor or the like. The processing unit 118 is arranged to communicate, via a system bus 120, with an I/O subsystem 122 (and thereby with external networks, displays, and the like) and a memory 124.

The skilled person will appreciate that memory 124 may be provided by a variety of components including a volatile memory, a hard drive, a non-volatile memory, etc. Indeed, the memory 124 comprise a plurality of components under the control of the, or otherwise connected to, the processing unit 118.

However, typically the memory 124 provides a program storage portion 126 arranged to store program code which when executed performs an action and a data storage portion 128 which can be used to store data either temporarily and/or permanently.

In other embodiments at least a portion of the processing circuitry 112 may be provided remotely from the vehicle. As such, it is conceivable that processing of the data generated by the first sensor 100 is performed off the vehicle 102 or a partially on and partially off the vehicle 102. In embodiments in which the processing circuitry is provided both on and off the vehicle then a network connection (such as a 3G UMTS (Universal Mobile Telecommunication System) or WiFi (IEEE 802.11) or like).

In the embodiment shown, the program storage portion 126 comprises VO system 128 arranged to determine the trajectory of the monitoring unit 10 (and/or vehicle, or the like, on which the unit is mounted); a timer 130 arranged to generate timing information from clocks associated with the first sensor and the second sensor; a LIDAR processor 132 arranged to process the received data from the LIDAR sensor. The data storage portion 128 may contain trajectory data 134 which provides the trajectory of the vehicle; laser return data 136 which provides information on the data returned from the or each LIDAR sensor 103; and a representation of the environment 138 generated according to an embodiment. Other data may also be stored within the data storage portion 128 and other routines, or the like, may be stored within the program storage portion 126.

In the embodiment being described, the representation of the environment comprises a Point Cloud which may be referred to as a LIDAR point cloud. In other embodiments, other 3D reconstructions may be provided such as a splint cloud.

In some embodiments, including the one being described, the timer 130 is arranged to employ techniques as described below to relate a plurality of time series (such as series of clock pulses) to one another.

Looking at FIG. 8, which shows the monitoring unit 10 in more detail, it can be seen that the monitoring unit 10 comprises a housing 804 on which the two LIDARs 800,802 and the first sensor 100 are mounted. Accordingly, the LIDARs 800, 802 and first sensor 100 are in a fixed relationship relative to one another which, in such embodiments, is convenient since it means that data generated by each of the sensors is generated from points which are in a fixed relationship to one another.

In the embodiment being shown, which was used for development purposes, the mobile unit 10 also comprises a Global Positioning Sensor (GPS) 806, a set of four monocular cameras (808a, 808b, 808c and 808d (not visible)), an Inertial Measurement Unit (IMU) 810 and the processing circuitry 112. Thus, the monitoring unit 10 provides a self contained unit.

The embodiment shown in FIG. 10 also comprises a housing 1000 containing a first sensor 1002 (a pair of stereoscopic cameras) and a LIDAR sensor 1004. Again, the first sensor 1002 and the LIDAR sensor 1004 are held, by being affixed to the housing 1000, in a fixed orientation relative to one another. In the embodiment of FIG. 10, there are no further sensor provided in addition to the LIDAR sensor 1004 and the first sensor 1002.

The first sensor 100, the processing circuitry 112 to which the first sensor 100 is connected, together with the software running on the processing circuitry 112 form what is often termed a Visual Odometry (VO) system. In the embodiment being described, the VO system continuously produces a 3D model of the world using the data generated from the cameras (104, 106).

Figure 3A:
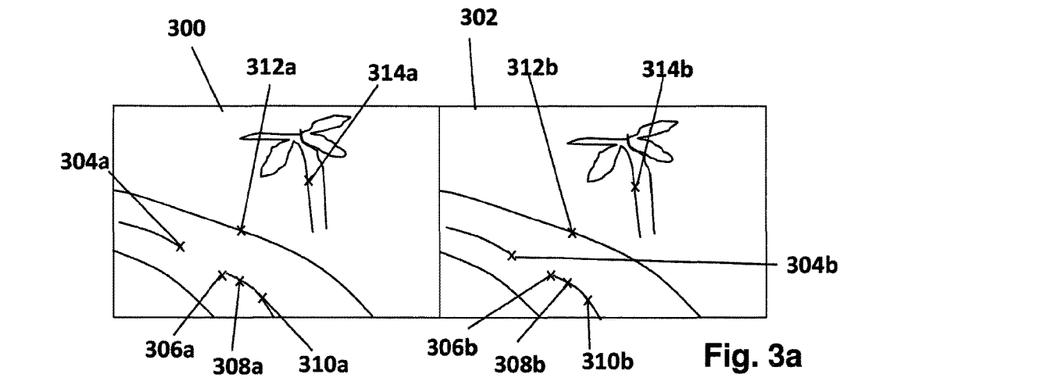
FIG. 3a exemplifies first and second initial camera images.
Figure 3B:
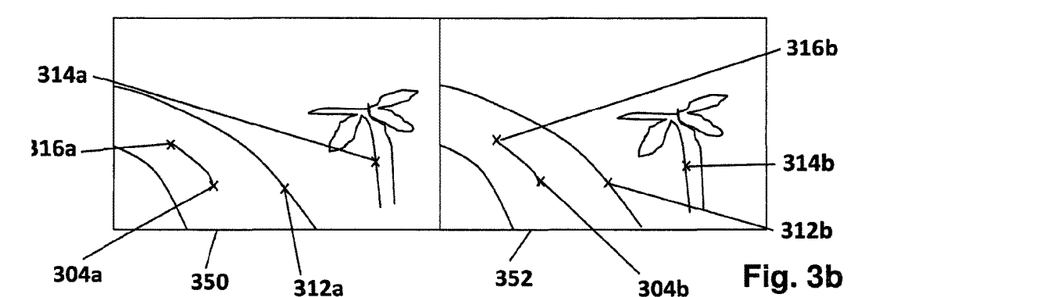
FIG. 3b exemplifies first and second camera images, similar to those in FIG. 3a, but at a later time.

Typically, and as exemplified in FIGS. 3a and 3b, the VO system locates points (which may be referred to as features or nodes) within each image from the camera pair which can be located in both images of the stereo pair.

FIG. 3a exemplifies an image 300 captured by camera 104 and image 302 captured by the camera 106. The pair of images shown in FIG. 3a provide a stereoscopic view of the locale around the vehicle 102. In the example, given in FIG. 3a, the VO system has identified points 6 points which are common to both the images. These 6 points are shown at 304 to 314 and are noted with an 'a' in image 300 and a 'b' in FIG. 302.

The points identified by the VO system are then tracked between subsequent images to generate a trajectory of the first sensor 100.

For example at a later time, the camera 104 captures the image shown at 350 and the camera 106 captures the image shown at 352. In this example, it can be seen that points 306a, 306b, 312a, 312b, and 314a and 314b remain within these images captured at a later time but are in different positions relative to the image. The VO system may of course (and is perhaps likely) to detect further points within the images. In the example of FIG. 3b, the VO system as detected points 316a and 316b which were not detected in the images 300, 302 captured at the earlier time.

The skilled person will appreciate that it is likely that many more points will be detected and tracked between the left and right images and between time frames (ie between an image at an earlier time and at a later time).

Figure 4:
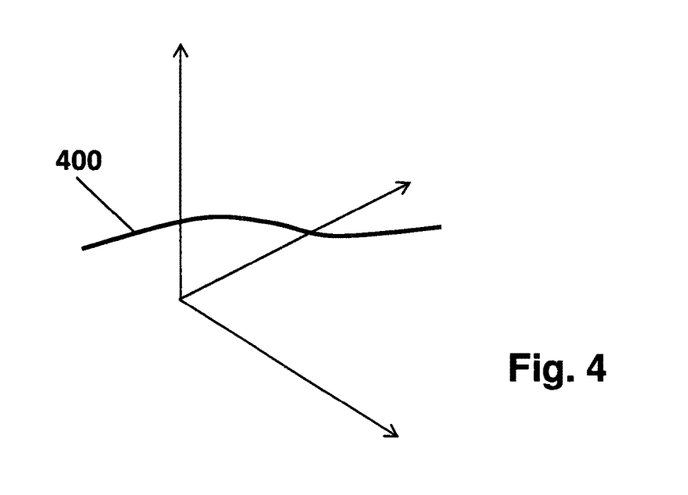
FIG. 4 exemplifies a trajectory determined from the images of FIGS. 3a and 3b.

Since the location of the first sensor 100 relative to the monitoring unit is known and this case fixed then it is possible to also calculate, perhaps using the processing circuitry 112, the trajectory of the vehicle 102 as shown at 400 in FIG. 4. Thus, the processing circuitry 112 receives data from the first sensor 100 and generates the trajectory 400 therefrom 902; ie the processing circuitry generates trajectory data 134 from the images input thereto.

In the embodiment being described, the processing circuitry, and in particular the VO system 128, is arranged to match points between images taken at different times (ie temporal matching) before it matches points between the cameras 104, 106 (ie stereoscopic matching). That is, and referring to FIGS. 3a and 3b the VO system 128 matches points between images 300 and 350 and between images 302 and 352 before it matches points between images 300 and 302 and between images 350 and 352.

In some embodiments of the monitoring unit 102, in which the processing circuitry contains a number of clocks, or which there are delays as the timing signals generated by a system clock, propagate around the processing circuitry, there can be problems in determining when an event occurs. Accordingly, it is known to employ algorithms such as TICSync to accurately determine when an event occurs. TICSync may be thought as a timer.

TICSync was first described in a paper "TICSync: Knowing When Things Happened" by Alastair Harrison and Paul Newman; IEEE International Conference on Robotics and Automation; Shanghai China, May 2011. The skilled person is directed to read this paper in order to understand the TICSync algorithm and its contents in relation to the timing of events on the vehicle 102 is hereby incorporated by reference. TICSync uses statistical methods to determine network delays which allows a determination to made as to when an event (such as the receipt of a LIDAR return, or a point on a trajectory) to be determined.

In any communication between devices within the processing circuitry and devices connected thereto via the I/O subsystem 122 (such as between the first sensor 100 and Processing unit 118) there will be data packets passing in both directions. For example in the example of the first sensor 100 and processing unit 118 this may be a request from one or other of the devices and a response thereto by the other. In view of delays within the journey of the request and response, different processing loads on the first sensor 100 and processing unit 118 the propagation time for the data packets to make the request and response is likely to be different in each direction.

Embodiments using TICSync accumulates the propagation times for requests and responses for device communicating with one another within the vehicle 102 and lower and upper bound for the propagation time for each of the request and responses. A convex hull based algorithm is then used to process the propagation times. The TICSync algorithm allows clock drift (perhaps due to temperatures and the like) to be tracked. The TICSync algorithm also provides and upper bound error estimate for the propagation time. Thus, TICsync provides an example of a method in which an estimate of the delay between clocks can be used to process different time series (eg outputs from different clocks) such that they can be related to one another in order that the time at which an event occurred can by synchronized regardless of the clock that timed the event. This steps is referred to at 906 in FIG. 9.

Thus, in the embodiment being described each of the first sensor 100 and the LIDAR sensor 103 are run by different clocks and for example, the first sensor 100 may be processed by a first clock and the LIDAR sensor 103 may be processed by a second clock. Thus, the string of clock pulses from the first clock may be considered a first time series and likewise the string of clock pulses from the second clock may be considered a second time series.

Figure 2:
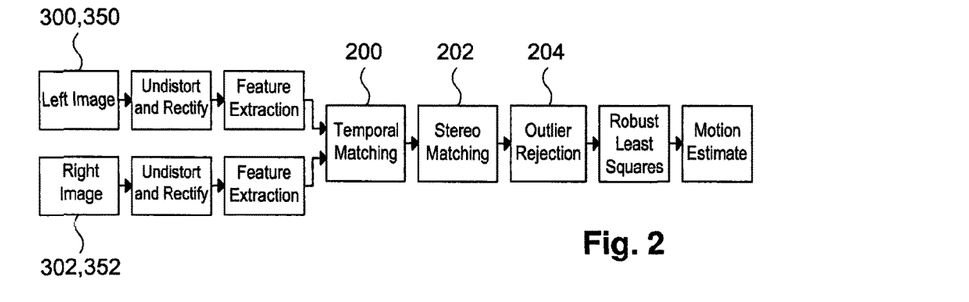
FIG. 2 shows stages in a Visual Odometry process.

Returning the VO system employed on the monitoring unit 10, a general and more detailed overview when compared to that discussed in FIG. 3, is provided. The processing circuitry 112 processes a sequence of stereo frames (eg 300, 302) captured by the two cameras 104, 106 $\mathcal{F}^k = \{\mathcal{F}_0, \ldots \mathcal{F}_k\}$ indexed by k (ie where k is the frame number). For the first frame $\mathcal{F}_0$ a set of points is extracted from each image. Denoting pixel locations in the left image by $z_L = [u_1, v_1]^T$ and in the right image by $Z_R = [u_r, v_r]^T$, where the subscript on u and v indicate the camera. $z_L$ and $z_R$ are referred to as "features" (eg the points 304-316) and each are additionally characterised by a descriptor which is a function of the local image region. After distortion has been removed and features extracted then features are matched between frames at different times (eg between frames k−1 and k) which is referred to as temporal matching 200.

Pairs of features from the left and right image are matched (202) to produce a stereo measurement, which takes the form $$z = \begin{bmatrix} z_L \\ z_R \end{bmatrix} \qquad 1.1$$

and by using the known properties of the stereo camera is triangulated to produce a 3D position of the features called a landmark, $p^g = [x, y, z]^T$, where g is a globally unique id.

For all subsequent frames, the processing circuitry 112 is arranged to match features in the latest frame to landmarks from local previous frames. Once the data associations have been made and features matched to the landmarks, the processing circuitry computes the 6 degree of freedom (DoF) motion of the camera between k and k−1. This is stored as a 4×4 transformation matrix with the form $$T = \begin{bmatrix} R & \rho \\ 0 & 1 \end{bmatrix} \qquad 1.2$$

where R is a 3×3 rotation matrix ($R^T = R^{-1}$, det(R)=1) and $\rho$ is a 3×1 translation vector. T can be parameterised by a 6×1 vector $t = [x, y, z, \theta_r, \theta_p, \theta_q]^T$ where x, y and z are the translation and $\theta_r$, $\theta_p$ and $\theta_q$ are roll, pitch and yaw respectively.

Camera motion is stored in a graph, $G_{vo} = (N_{vo}, T_{vo})$. Nodes, $n_k \in N_{vo}$, represent stereo frames at time k. Edges, $T_{i,j} \in T_{vo}$, describe the motion between two nodes i and j, where $T_{i,j}$ represents the motion of the camera from j to i. Landmarks are stored relative to frame s and after being observed in frame i. Here a Landmark is a distinct feature or a set of features within an image identified by the VO system 128. To move a landmark from one frame to another the processing circuitry 112 applies the following transformation:

$$\bar{p}_i = \mathcal{T}_{i,s}(\bar{p}_s) = T_{i,s} \bar{p}_s \qquad 1.3$$

where $\bar{p}$ is the 4×1 homogeneous representation of p and $\mathcal{T}_{i,s}(\bullet)$ is a function which returns the concatenated sequence of transforms between i and s−$T_{i,s}$. Observations of landmark g in frame i are denoted as $z_i^g \cdot G_{vo}$ grows incrementally as new frames arrive and to prevent unnecessary genesis of new nodes and edges, a keyframe approach is adopted whereby a new node is only added to the graph if the movement between two frames is above some threshold or the number of trackable features changes significantly. This prevents unnecessary graph growth while the camera is stationary or moving slowing.

A camera projects world points in $\mathbb{R}^3$ to points in $\mathbb{R}^2$ on the image plane. To estimate the motion of the camera, a model of this projection is required. Assuming an ideal camera we can use the standard pin-hole camera model and define a camera frame, where the origin is placed at the optical centre of the camera. A point $p = [x, y, z]^T$ in the camera frame projects to a pixel location on the image plane $z = [u, v]^T$. For a known camera focal length, f the pixel location can be computed using similar triangles:

$$\frac{u}{f} = \frac{x}{z} \qquad 1.4$$

$$u = \frac{fx}{z} \qquad 1.5$$

Applying a similar process to y, the pixel position becomes:

$$\begin{bmatrix} u \\ v \end{bmatrix} = \begin{bmatrix} \frac{fx}{z} \\ \frac{fy}{z} \end{bmatrix} \qquad 1.6$$

Equation (1.6) equation is non-linear but by adopting a homogeneous representation, the projection becomes linear. This is achieved via the following matrix:

$$\begin{bmatrix} u' \\ v' \\ w \end{bmatrix} = \begin{bmatrix} f & 0 & 0 & 0 \\ 0 & f & 0 & 0 \\ 0 & 0 & 1 & 0 \end{bmatrix} \begin{bmatrix} x \\ y \\ z \\ 1 \end{bmatrix} = [K | 0] \bar{p} \qquad 1.7$$

where K is the 3×3 camera calibration matrix. The inhomogeneous form of z can be recovered by:

$$\begin{bmatrix} u \\ v \end{bmatrix} = \begin{bmatrix} \frac{u'}{w} \\ \frac{v'}{w} \end{bmatrix} \qquad 1.8$$

K typically includes some extra details about the camera.

The origin of the image plane does not normally align perfectly with the optic axis, so an origin offset can be applied via $[u_0, v_0]$. This location is the principal point. If the camera has non-square pixels, a scaling of the focal length is needed. This can be captured by having different focal lengths, $f_u$ and $f_v$. Finally a skew parameter s can be added if the image axes are not perpendicular. This is typically zero for most cameras. K then takes the form:

$$K = \begin{bmatrix} f_u & s & u_0 \\ 0 & f_v & v_0 \\ 0 & 0 & 1 \end{bmatrix} \qquad 1.9$$

This collection of variables are referred to as the intrinsic camera parameters, as they affect how points in the camera frame project onto the camera plane.

In the case of stereo cameras, it is also useful to align the left and right images so the row in the left image corresponds to the same row in the right image. This process is called image rectification. When searching for correspondences in stereo pairs, rectification simplifies the search region to a 1-D line search in u, as feature points will share the same v coordinates.

For stereo cameras which are fixed together rigidly such as the Point Grey Bum-blebee2, the distortion correction and rectification only needs to be computed once. Further, these mappings can be combined into a single look-up table for each lens to enable fast processing.

After rectification the stereo camera is modelled as two fronto-parallel pinhole cameras separated by a distance b, known as the baseline.

In embodiments that generate colour images from the cameras 104, 106 then the images are converted to greyscale which provides sufficient information for future processing.

Some embodiments of the invention utilise the FAST corner detector algorithm in conjunction with the Binary Robust Independent Elementary Features (BRIEF) feature descriptor algorithm. Other embodiments may us other algorithms to detect features within the images such as the Scale Invariant Feature Transform (SIFT) or the Speeded-Up Robust Features (SURF) algorithm.

Some embodiments of the invention may use an enhancement to the FAST algorithm which refine putative FAST matches using Efficient Second-Order Matching (ESM) to obtain sub-pixel measurements.

Stereo matching 200 is the process of finding the same feature in both the left 300 and right 302 stereo images and because the stereo frames have been rectified, given a pixel position in one image, called the reference pixel, we can perform a restricted 1-D line search in the other stereo image to find the matching feature.

Embodiments may perform matching using dense stereo techniques, dense matching on a subset of points (such as FAST corners), or descriptor matching.

Embodiments take the FAST corner positions in the corresponding row and for each one compute the Sum of Absolute Differences (SAD) with respect to the reference pixel position. The best score is returned as a match, and if the row contains no FAST corners failure is returned.

The reference pixel position can come from two sources. Firstly, when spawning new landmarks, given a proposed reference pixel, a stereo correspondence is required to triangulate the landmark. The second case is when a landmark has been temporally matched in one image of a new stereo frame then a stereo match is required to complete the process.

Finding the feature matches between two stereo frames is called temporal matching 200. It is not as simple as stereo matching as the camera could have undergone arbitrary motion between the two capture times of the frames.

Embodiments having better feature descriptors (such as provided by BRIEF) tend to produce better data associations, improve the motion estimate and reduce the likelihood of tracking failure. With the advent of BRIEF it is possible to remove a windowing technique used in the prior art to constrain the matching process, as searching across the whole image is fast enough for real time operation. As such, embodiments employing BRIEF may not need to perform at least one of the following: compute an initial motion estimate or assume a motion model and selection of an appropriate search window size.

Given a set of correspondences from the matching process, embodiments recover the latest motion of the camera which can be achieved using numerical optimisation techniques. However such optimisation techniques can perform poorly when presented with data containing significant numbers of outliers (matches that do not imply the true motion of the camera and can be caused by things such as dynamic objects in the scene or incorrect data associations—ie incorrectly labeled points 304-314) which can be a by-product of the matching step. To reduce the number of outliers the data is passed to a more robust but less optimal estimator as a pre-cursor to the final optimisation step.

RANdom Sample Consensus (RANSAC) is an algorithm for robustly estimating a model solution given a set of outlier ridden data and some embodiments of the invention use RANSAC to improve the model from a given set of data and reject outliers 204. Such embodiments proceed by instantiating a model using the minimum number of data points, randomly sampled from the input data. The model is then scored by counting the number of data points which agree with it. This model generation and scoring repeated until it is likely a good model has been generated. The model and the input data, divided into inliers and outliers are returned. RANSAC finds a correct solution faster for models requiring fewer data points as the likelihood of selecting an outlier in the random set is reduced.

Other embodiments may use MSAC or Preemptive RANSAC instead of using RANSAC.

The RANSAC algorithm returns the best model given a set of data. This model choice is important as estimating the transform between two stereo frames can be done multiple ways.

Some embodiments of the invention may triangulate the 3D position of feature measurements in each stereo frame, and then find the rigid transform which minimises the error between the two sets of 3D points. This can be minimally solved with 3 data points.

Other embodiments find the transform which minimises the projection of the 3D points in the first frame to the 2D image coordinates in the second frame—the perspective from n points (PnP) problem. Again, the minimum required number of points is 3 (ie a P3P problem).

When computing the 3D position of a feature, the depth component has the largest error but for VO systems it is reasonable to assume that the inter frame motion is small and as such, the depth error has relatively little impact on the solution of 3D to 2D methods. For this reason embodiments employing PnP methods are typically preferred.

The embodiment being described employs a MSAC estimator with a P3P model to produce an initial guess of the camera motion and a set of inlier matches which is passed on to the numerical optimisation.

The inlier measurements, $z_i$, $i \in 1, \ldots, M$, are now used to refine the motion estimate. Embodiments, thus parameterise a set of state variables contained in the state vector x.

The MSAC algorithm re-weights residual errors depending on their magnitude, which reduces the impact of outliers.

Thus, given a landmark $p_s^g$ stored in frame s and an observation of g from frame i: $z_i^g$. The predicted state value is computed with the following function:

$$h_{i,s}^g(x) = \mathcal{K}(\mathcal{C}(\mathcal{T}_{i,s}^g(x))) \qquad 1.10$$

where $\mathcal{T}_{i,s}^g$ is the function which transforms the landmark g so that it is relative to frame i. C is a sensor (sensor 100) and robot (eg vehicle 102) to vision transform which moves the landmark into the appropriate stereo camera frame (left or right) and switches it from our extrinsic robotic frame to the internal computer vision frame. Finally, $\mathcal{K}$ is the camera projection function. The derivative of this function for state x becomes:

$$\frac{\partial h_{i,s}^g}{\partial x} = \frac{\partial \mathcal{K}}{\partial C} \frac{\partial C}{\partial \mathcal{T}_{i,s}^g} \frac{\partial \mathcal{T}_{i,s}^g}{\partial x} \quad 1.11$$

Starting from the right embodiments now compute each individual Jacobian.

Remembering that embodiments want to refine the 6 Degree of Freedom (DoF) pose estimate and all land-marks have been moved to the previous frame j=i−1 (by application of Equation (1.3) with the target frame i=j), embodiments compute the following:

$$\frac{\partial \mathcal{T}_{i,s}^g}{\partial \Delta t} = T_{i,j} \frac{\partial \Delta T}{\partial \Delta t} \quad 1.12$$

where the error is described by a delta transform $\Delta T$ parameterised by a 6 vector $\Delta t = [\delta x, \delta y, \delta z, \delta\theta_r, \delta\theta_p, \delta\theta_q]^T$ and have set $x = \Delta t$. The delta transform is evaluated about zero:

$$\left. \frac{\partial \Delta T}{\partial \Delta t} \right|_{\Delta t = 0}$$

and the transformation matrices are defined be created from t in the following way:

$$T(t) = \begin{bmatrix} R(t) & \rho(t) \\ 0^T & 1 \end{bmatrix} \quad 1.13$$

$$R(t) = R_z(\theta_q) R_y(\theta_p) R_x(\theta_r), \rho(t) = [x, y, z]^T \quad 1.14$$

and $R_x(\bullet)$, $R_y(\bullet)$, $R_z(\bullet)$ are the rotation matrices about the denoted axis.

The sensor and robot to vision transform function performs two tasks. The first is to move the landmark from the sensor frame i, (the frame in which we are estimating the motion) to each of the camera sensor frames via the transforms $T_l$ and $T_r$ (left and right respectively). The transform for the left camera is $I_{4\times 4}$ and a transform matrix generated from t=[0, −b, 0, 0, 0, 0], where b is the baseline of the camera for the right camera.

Accordingly, from the above the trajectory 400 of the vehicle 102 is determined by analysing the outputs from the two cameras 104, 106 which are part of the first sensor 100. Use of the TICSync algorithm also allows the time at which each frame of output from the cameras 104, 106 was taken.

Thus, as the vehicle 102 travels, the VO system provided by the processing circuitry processing the output of the two cameras 104, 106 generates, in real time, the trajectory of the first sensor 100. Since the relative position of the first sensor 100 and the monitoring unit 10/vehicle 102 is known then the trajectory of the vehicle 102 is also known. Here, and in any other reference herein, real-time may mean substantially as the vehicle 102 moves so that the processing may be used to aid navigation of the vehicle 102. The skilled person will appreciate that there will inevitably be a delay from an event occurring and the processing detailed above being performed. However, in embodiment of the invention the delay may be on the order of substantially a few 10's or a few 100's of milli-seconds.

However, in the embodiment of the invention being described, the timer 130 is arranged to determine and time stamp when data was created by each of the first sensor 100 and the LIDAR sensor 103. During subsequent processing the processing circuitry 112 uses the time stamp determined by the timer 130 to relate the occurrence of the generation of data generated by the different sensors 100, 103. In one embodiment the timer is provided by an implementation of the TICsync method.

The timer 130 may be arranged to determine the occurrence of an event to on the order of substantially millisecond accuracy. In other embodiments, the time 30 may be arranged to determine the occurrence of an event to substantially sub-microsecond accuracy.

In the embodiment being described, the first sensor 100 and the LIDAR sensor 103 are not required to have overlapping fields of view. In other embodiments, the two sensors may be arranged such that their respective fields of view do in fact overlap.

Figure 9:
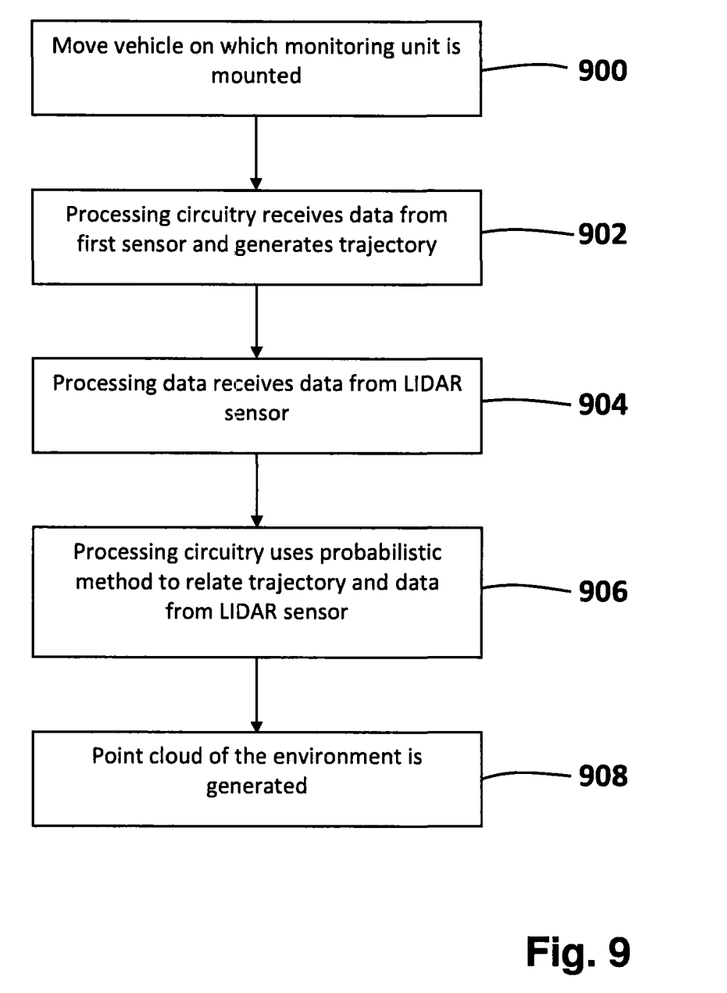
FIG. 9 shows a flow chart detailing an embodiment of the invention.

In order to fuse the data output from each of the first 100 and LIDAR 103 sensors the trajectory of the vehicle as calculated above is used and the LIDAR data (ie output from the second sensor 103 is retrospectively compared with the camera data (ie output from the first sensor). This retrospective comparison of the LIDAR and camera data uses the fact that the vehicle 102 motion causes an overlap of the respective fields of the sensors 100, 103. Thus, the processing circuitry receives data from the LIDAR sensor 904 which may be thought of as being laser return data 136.

In order to create a swathe with a 2D push-broom LIDAR it undergoes motion through its environment. Specifically, a swathe is constructed using a base trajectory estimate, $X^b(t)$, obtained using the trajectory generated by the VO and the putative calibration $^bT_1$ between the base trajectory and the LIDAR 103. Other embodiments may generate the trajectory from other sensor systems such as from an Inertial Navigation System (INS).

Figure 6:
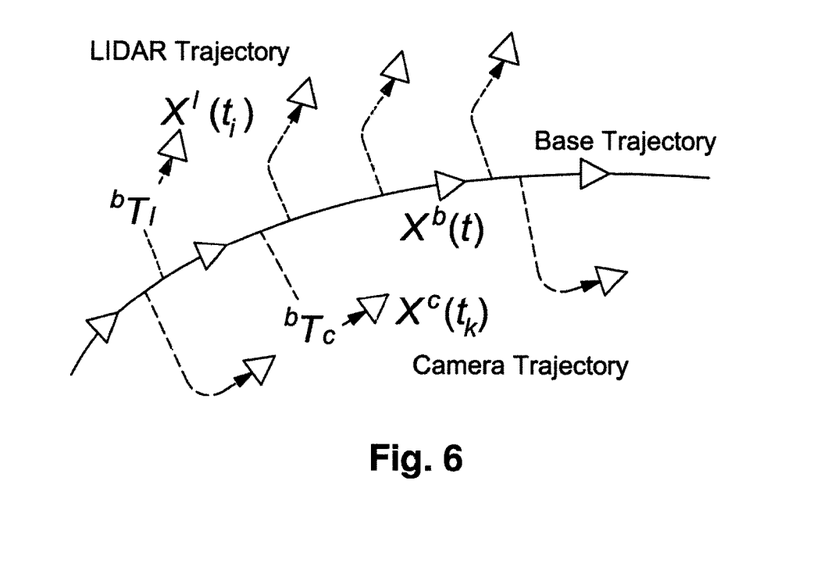
FIG. 6 exemplifies combining LIDAR return data with a trajectory of a camera.
Figure 7:
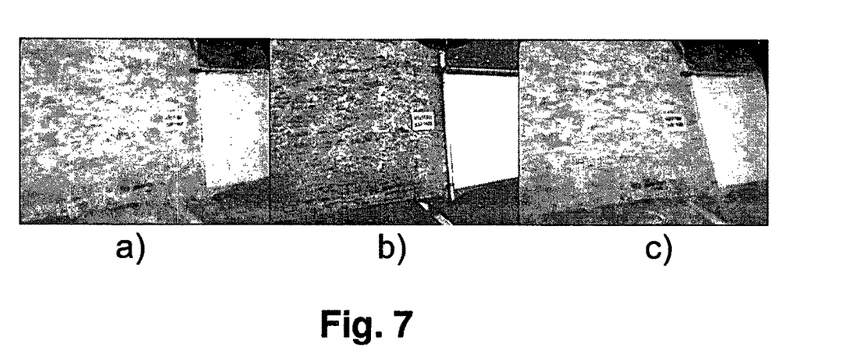
FIG. 7 shows examples of representations taken with a LIDAR.

The swathe is then projected into the camera using a calibration between the camera c and base trajectory $^bT_c$ as shown in FIG. 6. This calculation is facilitated in embodiments in which the first sensor 100 and the LIDAR 103 have a fixed orientation relative to one another. An interpolated LIDAR reflectance image is then generated and an example is shown in FIG. 7.

Next, the processing circuitry is arranged to use an edge-based, weighted SSD (Sum of Squares Distance) objective function to measure the alignment of an image captured by the camera and the LIDAR reflectance image. A simple iterative optimisation is used, in the embodiment being described, to search over the SE(3) pose which defines the extrinsic calibration and maximises the alignment of the camera image and the generated LIDAR reflectance image. The best estimate of the extrinsic calibration achieves the best alignment of the two images.

To generate a metrically correct swathe from the push-broom LIDAR requires accurate knowledge of the sensor's motion. In the general case shown in FIG. 6, a base trajectory $X^b(t)$ is a full SE(3) pose, (x, y, z, roll, pitch, yaw), as a function of time. $X^b(t)$ can be derived from a multitude of sensors including inertial navigation systems (INS) and visual odometry (VO), as long as the trajectory is metrically accurate over the scale of the swathe. The poses of the LIDAR and camera are given relative to this base trajectory.

Let the $i^{th}$ LIDAR scan be recorded at time $t_i$ and consist of a set of points, $x_i$, and a set of corresponding reflectance values, $R_i$, such that laser point j in this scan, $x_{ij}=[x_j,y_j]^T$, is associated with reflectance value $R_{i,j}$. Embodiments currently make the approximation that all points j within the ith scan are captured at the same time, but in reality each scan takes 20 ms, which may be thought of as being in real-time. As the data used for calibration was collected at purposefully slow speeds this approximation has a negligible effect. We first compute the pose of the LIDAR $X^l(t_i)$ based on the current putative extrinsic calibration $^bT_l$ and the base trajectory.

$$X^l=(t_i)=X^b(t_i)\oplus {}^bT_l \qquad 2.1$$

Where $\oplus$ denotes a composition operator. Each scan can then be projected into a local 3D scene $P_i$ creating a swathe of laser data.

$$P_i=X^l(t_i)\oplus x_i \qquad 2.2$$

The processing circuitry then generates a swathe as a function of the extrinsic calibration between the sensor base trajectory and the LIDAR. An example is shown in FIG. 5.

Next the processing circuitry is arranged to generate LIDAR reflectance images as viewed from the pose of the camera c capturing an image $\boldsymbol{I}_k^c$ at time $t_k$. First, the swathe $P_i$ is transformed into the camera's frame of reference using the current estimate of the extrinsic calibration between the base trajectory and the camera, $^bT_c$. The pose of the camera $X^c(t_k)$ at time $t_k$ is then written as:

$$X^c(t_k)=X^b(t_k)\oplus {}^bT_c \qquad 2.3$$

The swathe is then transformed into the camera's frame and projected into the camera using the camera's intrinsics, K, which are assumed to be known. Thus, $$P_{i,k}=\text{proj}(\ominus X(t_k)\oplus P_i,K) \qquad 2.4$$

gives us the pixel locations of the swathe points $p_{i,k}$ in the camera image $\boldsymbol{I}_k^c$. At this point we could use the individual LIDAR reflectance values $R_{i,k}$ and compare their reflectivity to the pixel intensities $\boldsymbol{I}_k^c(p_{i,k})$. However, the density of the points may be variable due to foreshortening effects as points at larger ranges from the camera map to smaller areas within the image. Some embodiments therefore use cubic interpolation to sample the intensities $R_{i,k}$ at pixel locations $p_{i,k}$ over the same grid as the pixels in $\boldsymbol{I}_k^c$. This generates a laser reflectance image $\boldsymbol{I}_k^c({}^bT_c,{}^bT_l)$ as a function of the extrinsic calibration, an example of which can be seen in FIG. 7.

In embodiments in which the base trajectory $X^b(t)$ is derived from stereo visual odometry the extrinsic calibration is simplified as the base frame is equivalent to the camera frame which reduces $^bT_c$ to the identity and, in turn, the search space from twelve degrees of freedom to six. The laser reflectance image then becomes a function only of $^bT_l$, which is equivalent to $^cT_l$, the extrinsic calibration between the LIDAR and camera.

Thus, a single camera image $\boldsymbol{I}_k^c$ can be used to generate, given data from a 2D LIDAR and knowledge of the platform trajectory, a corresponding laser reflectance image $\boldsymbol{I}_k^l({}^cT_l)$ based on a putative extrinsic calibration between the two sensors 100, 103.

Embodiments may also seek a metric which reflects the quality of the alignment between the two images (ie between the LIDAR and camera outputs). This task is made difficult by non-linearities in the reflectance data from the LIDAR rendering basic correlation measures such as mutual information and standard SSD ineffective.

Some embodiments may take a smoothed gradient image. Further, some embodiments may apply patch-based normalisation whereby local variations in gradient are normalised to be consistent across the whole image or at least between corresponding patches in $\boldsymbol{I}_k^c$ and $\boldsymbol{I}_k^l({}^cT_l)$. Embodiments which apply patch based normalisation are advantageous as local image gradients are enhanced and strong edges, which can dominate the objective function are avoided.

Next the pixel values from both images are then weighted by $w\boldsymbol{I}_k^c$ the inverse of the distance transform of the reflectance measurement $p_{i,k}$ over the image grid, giving extra weight to areas with a higher sampling density. The objective function can thus be expressed as $$O({}^cT_l) = \sum_{I_k^c} w_{I_k^c} \|Q(I_k^c) - Q(I_k^l({}^cT_l))\|_2 \qquad 2.5$$

where $$\sum_{I_k^c}$$

denotes the sum over all pixels in the image pair $\boldsymbol{I}_k^c$ and $\boldsymbol{I}_k^l({}^cT_l)$ and $Q(\bullet)$ denotes a function which performs Gaussian smoothing before taking the magnitude gradient image and performing patch based normalisation. One embodiment of the invention used a Gaussian kernel of substantially 25×25 pixels with a variance of 6.5 and a patch size of 20×20 pixels for the patch based normalisation procedure.

Thus, embodiments generate a representation of the environment, as illustrated in FIG. 5, by causing the processing circuitry to generate a point cloud from the LIDAR sensor data and the data from the first sensor (step 908). The representation generated by the method may be stored in the data storage portion of the memory 128 as the representation 138.

Other embodiments of the invention may utilise other methods of determining the time at which an event occurs on the monitoring unit 10. For example, it is known to use the Network Time Protocol (NTP) published in the IEEE transactions vol. 39, no. 10 p 1482-1493 which causes individual clocks of the processing circuitry to align themselves with a selected clock.

The invention claimed is:
1. A method of generating a 3D reconstruction of an environment around a monitoring-unit as the monitoring-unit is moved through the environment, the method comprising:
   providing at least a camera and a LIDAR sensor, wherein the camera and the LIDAR sensor are provided at a fixed, predetermined, orientation relative to one another and are controlled by independent clocks;
   using the camera to determine a trajectory of the monitoring-unit as the monitoring-unit moves through the environment;
   determining a first time series using the clock of the camera, where the first time series details when the monitoring-unit was at predetermined points of the trajectory;
   scanning the environment with the LIDAR sensor;
   recording returns from the LIDAR sensor;

determining a second time series using the clock of the LIDAR sensor, where the second time series details when each scan from the LIDAR sensor was taken;

processing the first and second time series;

using a timer to relate the first and second time series in order to match the returns from the LIDAR sensor to a point on the trajectory at which a return was received; and creating, using the fixed, predetermined, orientation between the camera and the LIDAR sensor, the 3D reconstruction based upon the returns.

2. A method according to claim 1 which the timer is provided by a statistical method to relate the first time series and the second time series.

3. A method according to claim 2 which the statistical method uses the TICsync algorithm to provide the timer.

4. A method according to claim 1 which uses a stereoscopic pair of cameras to generate a stream of stereoscopic images of the environment as the monitoring-unit is moved through the environment.

5. A method according to claim 4 which processes the stream of stereoscopic images to generate the trajectory.

6. A method according to claim 1 which determines the fixed, predetermined, orientation of the camera and the LIDAR sensor by processing data received from the camera and the LIDAR sensor.

7. A non-transitory machine readable medium containing instructions which when read by a machine cause that machine to perform the method of claim 1.

8. A monitoring unit comprising:

processing circuitry arranged to receive data from each of a camera and a LIDAR sensor;

wherein the camera is controlled by a first clock, which provides a first time series, and the camera is mounted in a fixed orientation relative to the monitoring unit and wherein the processing circuitry is arranged to generate a trajectory from the data received from the camera;

wherein the LIDAR sensor is controlled by a second clock, which provides a second time series, and the LIDAR sensor is mounted in a fixed orientation relative to the monitoring unit and wherein the LIDAR sensor is arranged to scan the environment of the monitoring unit as the monitoring unit is moved through the environment; and wherein the processing circuitry is arranged to:
receive the data from the LIDAR sensor in addition to the data from the camera,
process the first and second time series,
use a timer to relate the first and second time series together,
match the data from the LIDAR sensor to the trajectory, and
generate a 3D reconstruction of the environment from the matched data.

9. A unit according to claim 8 comprising at least one two-dimensional LIDAR sensor.

10. A unit according to claim 9 in which the LIDAR sensor is mounted in a push-broom arrangement.

11. A unit according to claim 8 comprising two LIDAR sensors.

12. A unit according to claim 11 wherein the two LIDAR sensors comprise the LIDAR sensor and a two-dimensional LIDAR sensor.

13. A unit according to claim 8 in which the camera and the LIDAR sensor are arranged such that they do not have overlapping fields of view.

14. A unit according to claim 8 in which the monitoring unit is arranged within a single unit capable of being carried by a user.

15. A unit according to claim 14 in which the monitoring unit is arranged as a back-pack capable of being worn by a user.

16. A unit according to claim 8 which comprises a stereoscopic pair of cameras.

17. A unit according to claim 8 comprising a non-transitory machine readable medium containing instructions which when read by a machine causes the processing circuitry to perform at least one step.

18. A unit according to claim 17 wherein the medium comprises a physical medium.

19. A unit according to claim 17 wherein the medium comprises a transmitted signal.

* * * * *